United States Patent [19]

Eguchi et al.

[11] 4,258,072
[45] Mar. 24, 1981

[54] MIXED SEASONING

[75] Inventors: Hajime Eguchi, Yokohama; Hideko Furukawa, Tokyo; Toshiaki Miyanishi, Yokosuka; Makoto Sakaguchi, Kawasaki, all of Japan

[73] Assignee: Ajinomoto Co., Inc., Tokyo, Japan

[21] Appl. No.: 50,516

[22] Filed: Jun. 21, 1979

[30] Foreign Application Priority Data

Jun. 21, 1978 [JP] Japan .................................. 53-74965

[51] Int. Cl.³ .............................................. A23L 1/229
[52] U.S. Cl. .................................... 426/537; 426/650
[58] Field of Search ............... 426/638, 649, 650, 537, 426/534

[56] References Cited

U.S. PATENT DOCUMENTS

| | | | |
|---|---|---|---|
| 3,039,880 | 6/1962 | Kawamura et al. | 426/649 X |
| 3,340,069 | 9/1967 | Matsuda et al. | 426/650 X |
| 3,505,082 | 4/1970 | Miller | 426/649 |
| 3,591,391 | 7/1971 | Kinoshita et al. | 426/650 X |
| 3,615,598 | 10/1971 | Funakoshi et al. | 426/650 X |
| 3,782,974 | 1/1974 | Lontz et al. | 426/649 |
| 4,066,793 | 1/1978 | Eguchi | 426/650 X |

OTHER PUBLICATIONS

Kyawa Fermentation Industry Co., Ltd., Chemical Abstracts 66: 18163c, p. 1736, (1967).
Kuninaka et al., *Food Technology*, 287, (1964), 29-35.

*Primary Examiner*—Joseph M. Golian
*Attorney, Agent, or Firm*—Oblon, Fisher, Spivak, McClelland & Maier

[57] ABSTRACT

A mixed seasoning, comprising 100 parts by wt. monosodium glutamate; 0.05 to 25 parts by wt. of a flavor inducing 5'-nucleotide; 5.0 to 38.0 parts by wt. table salt; 0.1 to 0.87 parts by wt. succinic acid and/or sodium succinate; and 0.5 to 10.0 parts by wt. of at least one alkali salt of an organic acid selected from the group consisting of sodium fumarate, sodium citrate, sodium or calcium lactate, sodium maleate, sodium tartrate, sodium ascorbate and sodium aspartate.

4 Claims, No Drawings

MIXED SEASONING

BACKGROUND OF THE INVENTION

1. Field of the Invention

The present invention relates to a mixed or combination seasoning as a flavoring agent. More particularly, the present invention is concerned with a mixed seasoning, the taste of which is almost the same in quality as monosodium L-glutamate, and the tasting power of which is about two to three times that of monosodium L-glutamate when used in combination with table salt.

2. Description of the Prior Art

It is well known that the combination of monosodium L-glutamate (MSG) and a flavor inducing 5'-nucleotide, such as disodium inosine-5'-monophosphate (IMP), disodium guanosine-5'-monophosphate (GMP), or mixtures thereof, exhibits a synergistic flavoring activity. Moreover, mixtures comprising MSG and a flavor inducing 5'-nucleotide have long been widely used as economical flavoring agents or seasoning agents for various foods and beverages. However, the conventional mixed seasoning agents are necessarily satisfactory for all foods and beverages. For example, when many conventional mixed seasoning agents are used to season Chinese dishes, especially Chinese soup, satisfactory results may not be obtained in comparison to the results achieved with the use of MSG alone.

It is generally known that there is some difference in taste quality between conventional mixed seasoning agents and MSG, and that while conventional mixed seasoning agents possess the same delicious taste as MSG, they impart a sweet taste to the foodstuff being flavored. This sweetness is undesirable when the conventional seasoning agents are used in Chinese dishes or soup. This undesirable sweet taste becomes stronger as the concentration of the seasoning agent in Chinese dishes or soup is increased, or the proportion of the flavoring 5'-nucleotide component in the mixed seasoning becomes higher. A need therefore continues for a mixed seasoning agent which enhances the flavoring characteristics of MSG, but which does not give rise to other undesirable tastes.

SUMMARY OF THE INVENTION

Accordingly, one object of the present invention is to provide a mixed seasoning agent which enhances the desirable flavoring characteristics of monosodium glutamate.

Another object of the present invention is to provide a mixed seasoning agent for various foods and beverages.

Briefly, this object and other objects of the present invention as hereinafter will become more readily apparent can be attained by a mixed seasoning agent which has the same quality as monosodium glutamate when used in various foods and beverages containing 0.4 to 1.2 g/dl table salt and which is formed from a combination of 100 parts of MSG, 0.05~25 parts of a flavor inducing 5'-nucleotide, 5.0~38.0 parts of table salt, 0.1~0.87 parts of succinic acid and/or sodium succinate and 0.5~10.0 parts of one or more of an alkali salt of an organic acid selected from the group consisting of sodium fumarate, sodium citrate, sodium or calcium lactate, sodium maleate, sodium tartrate, sodium ascorbate and sodium aspartate.

DETAILED DESCRIPTION OF THE PREFERRED EMBODIMENTS

The first ingredient employed in the mixed seasoning agent of the present invention is the known flavoring agent, monosodium glutamate.

The second ingredient employed in the present seasoning agent is a known flavoring inducing 5'-nucleotide such as IMP, GMP or sodium ribonucleotide. In the present composition, the second ingredient constitutes from 0.05 to 25 parts by wt, preferably 0.1 to 15 parts by wt. of the composition based upon 100 parts by wt. of the first ingredient (MSG). The factors which determine the quantity of the second ingredient employed are the strength of tasting power of the mixed seasoning to be prepared and the kind of second ingredient employed in the seasoning mixture.

The proportion of the third ingredient, i.e. table salt, in the mixed seasoning of the present invention ranges from 5.0 to 38.0 parts by wt., preferably 7.0 to 29 parts by wt. based on MSG. The proportion of salt added in determined by the proportion or kind of second ingredient employed.

In the composition of the present invention, free succinic acid, monosodium succinate, disodium succinate or mixtures thereof, are employed as the fourth ingredient and the amount of the fourth ingredient employed in the composition is determined by the kind and proportion of the second ingredient employed. Normally, very small amounts of the fourth ingredient, that is, 0.1 to 0.9 parts by wt., preferably 0.15 to 0.63 parts by wt. of the fourth ingredient are used based upon MSG.

With regard to the fifth component of the present composition, one or more alkali salts of organic acids selected from the group consisting of sodium fumarate, sodium citrate, sodium or calcium lactate, sodium maleate, sodium tartrate, sodium ascorbate and sodium aspartate are employed in combination with the mentioned ingredients. When citrate and succinate salts are employed, not only can normal salts be employed, but also, more preferably, acid salts can be used.

In the preparation of the seasoning mixture of the present invention, generally from 0.5 to 10.0 parts by wt., preferably 1.0 to 8.1 parts by wt., of the fifth ingredient are employed based upon MSG. However, with regard to one member of the group, i.e. sodium aspartate, it should be used in an amount of about 10 times the amount of the other members of the group since its power to restrain undesirable sweetness in the mixed seasoning and to regulate the quality of taste of the mixed seasoning is about one-tenth that of the other members of the group.

Of the members of the group which constitute the fifth ingredient of the present composition, monosodium fumarate is preferably used since the quality of the mixed seasoning agent containing monosodium fumarate is better than the quality of seasoning agents containing other members of the fifth ingredient.

The mixed seasoning agent of the present invention has the same taste quality as MSG and strong tasting power of about two to three times that of MSG. In the examples, parts are given in parts by weight.

Having generally described this invention, a further understanding can be obtained by reference to certain specific examples which are provided herein for purposes of illustration only and are not intended to be limiting unless otherwise specified.

EXAMPLE 1

A mixed seasoning (A) consisting of 86.33 parts of MSG, 0.23 parts of IMP, 10.91 parts of table salt, 2.0 parts of monosodium fumarate, and 0.53 parts of disodium succinate was prepared in the following manner. Crystals of MSG and table salt were intimately admixed. To the admixture, other ingredients, each in the form of a fine powder, were added and homogeneously mixed with the salt mixture. Then, 1.0 to 4.0% (by weight) of water was added to the combined ingredients and the mixture was dried to give a product of about 100 parts by weight of powdered mixed seasoning (A).

Separately, a soup base to which seasoning (A) was added in order to conduct organoleptic testing of the seasoning was prepared by the following process: A mixture of 500 g of chicken bone and 500 g pig bone was added to 8.0 liter of water, and the aqueous mixture was boiled for three hours. The extract was filtered to obtain 6.0 liters of soup base, to which was added 48 g of table salt (the concentration of table salt was about 0.8 g/dl). Seasoning (A) and MSG (control) was organolepticly tested by a panel of 20 members who had been specially trained for this kind of test.

A 0.5~1.0 g/dl amount of seasoning (A) was added to the soup base containing 0.8 g/dl table salt and as the control, 1.0~2.0 g/dl of MSG was added to another portion of soup base. Then, the panel test was performed by the triangle test method with the two soup base samples. The results obtained are shown in Table 1.

TABLE 1

| Exp. No. | Concentration of Sample MSG (control) | Season-ing A | Panel Members Discriminated | Results |
|---|---|---|---|---|
| 1 | 0.4 g/dl | 0.25 | 9 | no discrimination between samples |
| 2 | 1.0 g/dl | 0.5 | 7 | no discrimination between samples |
| 3 | 2.0 g/dl | 0.75 | 6 | no discrimination between samples |

Table 1 shows that no difference in taste quality was discerned by the panel members between seasoning (A) and the control.

As to the tasting power of seasoning (A), it was found that the tasting power of seasoning (A) is about two to three times that of control (MSG).

EXAMPLE 2

A mixed seasoning (B) consisting of 86.33 parts of MSG, 0.23 parts of IMP, 10.91 parts of table salt, 2.0 parts of monosodium fumarate and 0.53 parts of disodium succinate was prepared in the same manner described in Example 1 for the preparation of seasoning (A). Mixed seasoning (B) was then subjected to organoleptic testing in the same manner described in Example 1 for seasoning (A).

It was found that the tasting power of seasoning (B) was two to three times that of the control and that no difference in tasting quality was discerned between seasoning (B) and the control.

EXAMPLE 3

A mixed seasoning (C) consisting of 80.25 parts of MSG. 0.24 parts of IMP, 14.50 parts of table salt, 4.74 parts of disodium dl-maleate and 0.27 parts of monosodium succinate was prepared in the same manner described in Example 1 for the preparation of seasoning (A). Mixed seasoning (C) was then subjected to organoleptic testing in the same manner described in Example 1, and it was found that the tasting power of seasoning (C) was two to three times that of the control and that no difference in tasting quality was discerned between seasoning (C) and the control.

EXAMPLE 4

A mixed seasoning consisting of 49.49 parts of MSG, 0.51 parts of IMP, 10.00 parts of table salt, 39.85 parts of monosodium L-aspartate and 0.15 parts of free succinic acid was prepared by the following process: To a mixture of crystals of MSG and monosodium L-aspartate were added other ingredients, each in the form of a fine powder, and the resulting material was mixed to a state of homogeneity. Then 1 to 4% of water was added to the mixture which was thereafter dried by a fluid type drying method.

The mixed seasoning (D) was then subjected to organoleptic testing in the same manner described in Example 1 and it was found that the tasting power of seasoning (D) was two to three times that of the control and that no difference in tasting quality was discerned between seasoning (D) and the control.

EXAMPLE 5

Mixed seasonings (E), (F), (G) and (H) were prepared from the ingredients shown in Table 2 in the same manner as described in Example 1 for the preparation of seasoning (A).

TABLE 2

| INGREDIENTS FOR THE MIXED SEASONINGS | |
|---|---|
| SEASONING (E) | |
| MSG | 86.33 parts |
| IMP | 0.23 |
| Table salt | 8.21 |
| Calcium lactate | 5.00 |
| Succininc acid | 0.23 |
| SEASONING (F) | |
| MSG | 86.33 |
| GMP | 0.1 |
| Table salt | 11.34 |
| Monosodium Fumarate | 2.00 |
| Succinic acid | 0.23 |
| SEASONING (G) | |
| MSG | 86.00 |
| Sodium 5'-ribonucleotide | 0.26 |
| Table salt | 11.20 |
| Monosodium fumarate | 2.30 |
| Succinic acid | 0.24 |
| SEASONING (H) | |
| MSG | 82.0 |
| Sodium 5'-ribonucleotide | 0.15 |
| Table salt | 12.0 |
| Trisodium citrate | 5.31 |
| Disodium succinate | 0.54 |

Seasonings (E), (F), (G) and (H) were subjected to organoleptic testing in the same manner as described in Example 1 and it was found that the tasting power of seasonings, (E), (F), (G) and (H) were all two to three times that of the control (MSG) and that no difference in tasting quality was discerned between these samples and the control (MSG).

EXAMPLE 6

Mixed seasonings (I), (J), (K) and (L) were prepared from the ingredients shown in Table 3 in the same manner as described in Example 1 for the preparation of seasoning (A).

TABLE 3

THE INGREDIENTS FOR THE SEASONINGS

| Seasoning | MSG (parts) | IMP | Table Salt | Succinic Acid | Other Organic Acid |
|---|---|---|---|---|---|
| (I) | 88.5 | 0.12 | 9.38 | 0.20 | sodium lactate 1.80 |
| (J) | 85.0 | 0.14 | 11.40 | 0.20 | disodium maleate 3.26 |
| (K) | 84.0 | 0.14 | 12.66 | 0.20 | disodium tartrate 3.0 |
| (L) | 90 | 0.11 | 8.64 | 0.25 | sodium ascorbate 1.0 |

Mixed seasonings (I), (J), (K) and (L) were subjected to organoleptic testing in the same manner as described in Example 1 and it was found that the tasting power of these seasonings were all about 1.5 times that of the control and that no difference in taste quality was discerned between these seasonings and the control.

Having now fully described this invention, it will be apparent to one of ordinary skill in the art that many changes and modifications can be made thereto without departing from the spirit or scope of the invention set forth herein.

What is claimed as new and intended to be secured by Letters Patent is:

1. A mixed seasoning, comprising:
   (a) 100 parts by wt. monosodium glutamate;
   (b) 0.05 to 25 parts by wt. of a flavor incuding 5'-nucleotide;
   (c) 5.0 to 38.0 parts by wt. table salt;
   (d) 0.1 to 0.87 parts by wt. succinic acid and/or sodium succinate; and
   (e) 0.5 to 10.0 parts by wt. of at least one alkali salt of an organic acid selected from the group consisting of sodium fumarate, sodium citrate, sodium or calcium lactate, sodium maleate, sodium tartrate, and sodium ascorbate.

2. The mixed seasoning of claim 1, wherein the amount of ingredient (a) is as specified, the amount of ingredient (b), which is IMP and/or GMP, ranges from 0.1 to 15 parts by wt., the amount of ingredient (c) ranges from 7.0 to 29 parts by wt., the amount of ingredient (d) ranges from 0.15 to 0.63 and the amount of ingredient (e) ranges from 1.0 to 8.1, said ingredient (e) being at least one alkali salt of an organic acid selected from the group consisting of monosodium fumarate, and trisodium citrate, sodium or calcium lactate, disodium maleate, disodium tartrate, sodium ascorbate.

3. The mixed seasoning of claims 1 or 2, wherein said ingredient (e) is monosodium fumarate.

4. The mixed seasoning of claim 1, wherein said succinate and citrate salts are in the form of acid succinate and citrate salts.

* * * * *